(12) United States Patent
Su et al.

(10) Patent No.: US 9,219,916 B2
(45) Date of Patent: Dec. 22, 2015

(54) JOINT BASE LAYER AND ENHANCEMENT LAYER QUANTIZER ADAPTATION IN EDR VIDEO CODING

(71) Applicant: Dolby Laboratories Licensing Corporation, San Francisco, CA (US)

(72) Inventors: Guan-Ming Su, Fremont, CA (US); Qian Chen, Santa Clara, CA (US); Hubert Koepfer, Milpitas, CA (US); Sheng Qu, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 458 days.

(21) Appl. No.: 13/908,926

(22) Filed: Jun. 3, 2013

(65) Prior Publication Data

US 2013/0329778 A1 Dec. 12, 2013

Related U.S. Application Data

(60) Provisional application No. 61/658,632, filed on Jun. 12, 2012, provisional application No. 61/714,322, filed on Oct. 16, 2012.

(51) Int. Cl.

| | | |
|---|---|---|
| *H04N 19/90* | (2014.01) | |
| *H04N 19/126* | (2014.01) | |
| *H04N 19/136* | (2014.01) | |
| *H04N 19/186* | (2014.01) | |
| *H04N 19/179* | (2014.01) | |
| *H04N 19/187* | (2014.01) | |
| *H04N 19/36* | (2014.01) | |

(52) U.S. Cl.
CPC ....... *H04N 19/00945* (2013.01); *H04N 19/126* (2014.11); *H04N 19/136* (2014.11); *H04N 19/179* (2014.11); *H04N 19/186* (2014.11); *H04N 19/187* (2014.11); *H04N 19/36* (2014.11); *H04N 19/90* (2014.11)

(58) Field of Classification Search
None
See application file for complete search history.

(56) References Cited

U.S. PATENT DOCUMENTS

| | | | | | |
|---|---|---|---|---|---|
| 5,049,990 | A | * | 9/1991 | Kondo | .................. H04N 19/98 358/1.9 |
| 5,642,341 | A | * | 6/1997 | Stork | ..................... G11B 7/005 369/44.37 |
| 5,872,865 | A | * | 2/1999 | Normile | ............. G06K 9/00711 382/165 |

(Continued)

FOREIGN PATENT DOCUMENTS

| | | |
|---|---|---|
| WO | 2012/147022 | 11/2012 |
| WO | 2012/148883 | 11/2012 |
| WO | 2013/067101 | 5/2013 |

*Primary Examiner* — Y Lee
*Assistant Examiner* — Shadan E Haghani
(74) *Attorney, Agent, or Firm* — Konstantinos Konstantinides (57) ABSTRACT

An encoder receives one or more input pictures of enhanced dynamic range (EDR) to be encoded in a coded bit stream comprising a base layer and one or more enhancement layer. The encoder comprises a base layer quantizer (BLQ) and an enhancement layer quantizer (ELQ) and selects parameters of the BLQ and the ELQ by a joint BLQ-ELQ adaptation method which given a plurality of candidate sets of parameters for the BLQ, for each candidate set, computes a joint BLQ-ELQ distortion value based on a BLQ distortion function, an ELQ distortion function, and at least in part on the number of input pixels to be quantized by the ELQ. The encoder selects as the output BLQ parameter set the candidate set for which the computed joint BLQ-ELQ distortion value is the smallest. Example ELQ, BLQ, and joint BLQ-ELQ distortion functions are provided.

10 Claims, 7 Drawing Sheets

(56) References Cited

U.S. PATENT DOCUMENTS

| | | | |
|---|---|---|---|
| 9,098,906 B2* | 8/2015 | Bruls | G06T 9/004 |
| 2003/0058931 A1* | 3/2003 | Zhang | H04N 21/234327 |
| | | | 375/240.01 |
| 2003/0108102 A1* | 6/2003 | Demos | G06T 3/4007 |
| | | | 375/240.07 |
| 2010/0195901 A1* | 8/2010 | Andrus | H04N 5/213 |
| | | | 382/162 |
| 2013/0108183 A1* | 5/2013 | Bruls | G06T 9/004 |
| | | | 382/233 |
| 2013/0148029 A1 | 6/2013 | Gish | |

* cited by examiner

JOINT BASE LAYER AND ENHANCEMENT LAYER QUANTIZER ADAPTATION IN EDR VIDEO CODING

CROSS REFERENCE TO RELATED APPLICATIONS

This application claims the benefit of filing date to U.S. Provisional Application Ser. No. 61/658,632 filed on Jun. 12, 2012, and U.S. Provisional Application Ser. No. 61/714,322, filed on Oct. 16, 2012, both of which are hereby incorporated by reference in their entirety.

TECHNOLOGY

The present invention relates generally to images. More particularly, an embodiment of the present invention relates to the joint adaptation of the base layer and the enhancement layer quantizers in layered coding of video with enhanced dynamic range (EDR).

BACKGROUND

Display technologies being developed by Dolby Laboratories, Inc., and others, are able to reproduce images having high dynamic range (HDR). Such displays can reproduce images that more faithfully represent real-world scenes than conventional displays characterized by approximately three orders of magnitude of dynamic range (e.g., standard dynamic range SDR.)

Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'enhanced dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. Thus while perhaps somewhat narrower in relation to true scene referred HDR, EDR nonetheless represents a wide DR breadth. As used herein, the term 'simultaneous dynamic range' may relate to EDR.

To support backwards compatibility with existing 8-bit video codecs, such as those described in the ISO/IEC MPEG-2 and MPEG-4 specifications, as well as new HDR display technologies, multiple layers may be used to deliver HDR video data from an upstream device to downstream devices. In one approach, generating an 8-bit base layer version from the captured HDR version may involve applying a global tone mapping operator (TMO) to intensity (e.g., luminance, luma) related pixel values in the HDR content with higher bit depth (e.g., 12 or more bits per color component). In another approach, the 8-bit base layer may be created using an adaptive linear or non-linear quantizer. Given a BL stream, a decoder may apply an inverse TMO or a base layer-to-EDR predictor to derive an approximated EDR stream. To enhance the quality of this approximated EDR stream, one or more enhancement layers may carry residuals representing the difference between the original HDR content and its EDR approximation, as it will be recreated by a decoder using only the base layer.

Legacy decoders may use the base layer to reconstruct an SDR version of the content. Advanced decoders may use both the base layer and the enhancement layers to reconstruct an EDR version of the content to render it on more capable displays. As appreciated by the inventors here, improved techniques for layered-coding of EDR video are desirable for efficient video coding and superior viewing experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Joint adaptation of base layer and enhancement layer quantizers as applied to the layered coding of EDR video streams is described herein. A dual-layer EDR video encoder comprises an EDR-to-base layer quantizer (BL quantizer, BLQ) and a residual or enhancement layer quantizer (EL quantizer, ELQ). Given an EDR input to be coded by the encoder, this specification describes methods that allow for a joint selection of the parameters in both the BL and EL quantizers so that coding of the BL and EL streams is optimized. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to the joint adaptation of BL and EL Quantizers as applied to the layered coding of EDR video sequences. An encoder receives one or more input pictures of enhanced dynamic range (EDR) to be encoded in a coded bit stream comprising a base layer and one or more enhancement layer. The encoder comprises a base layer quantizer (BLQ) and an enhancement layer quantizer (ELQ) and selects parameters of the BLQ and the ELQ by a joint BLQ-ELQ adaptation method which comprises the following steps: given a plurality of candidate sets of parameters for the BLQ, for each candidate set, computes a joint BLQ-ELQ distortion value based on a BLQ distortion function, an ELQ distortion function, and at least in part on the number of input pixels to be quantized by the ELQ. The encoder selects as the output BLQ parameter set the candidate set for which the computed joint BLQ-ELQ distortion value satisfies a distortion test criterion (e.g., it is the smallest). Example ELQ, BLQ, and joint BLQ-ELQ distortion functions are provided.

In some embodiments the BLQ operation may be subdivided into clipping modes, such as a high-clipping mode and a low-clipping mode, each with its own output BLQ parameters. A joint BLQ-ELQ distortion value may be computed for each clipping mode and a final output set of BLQ parameters is selected based on the computed BLQ-ELQ distortion values.

Example Dual-Layer EDR Coding System

Figure 1A:
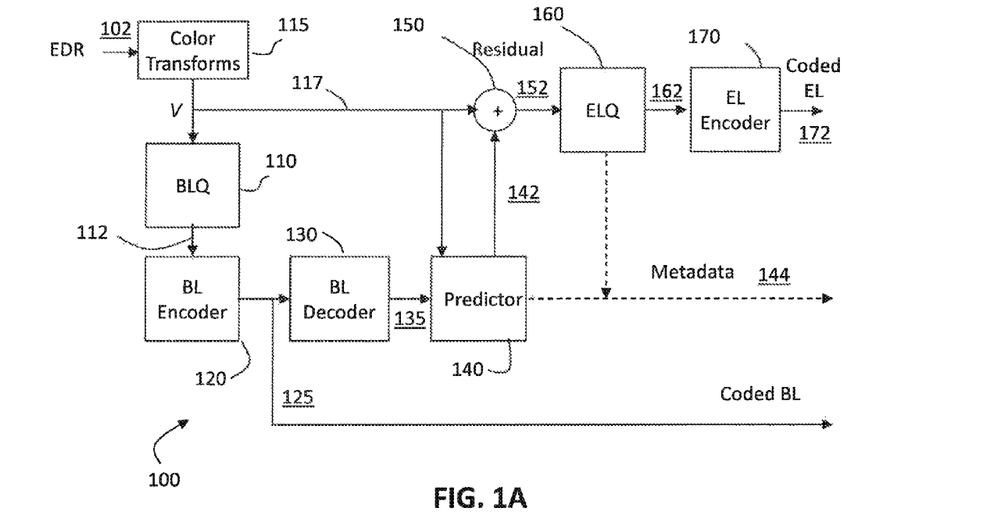
FIG. 1A and FIG. 1B depict example data flows for a layered EDR coding system according to an embodiment of the present invention.
Figure 1B:
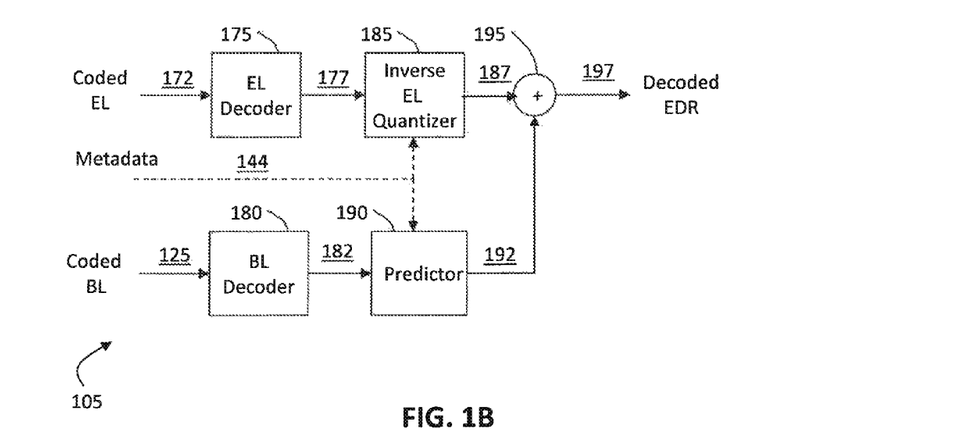

In some embodiments, a base layer and one or more enhancement layers may be used, for example by an upstream device (e.g., an EDR image encoder 100 of FIG. 1A), to deliver EDR image data in one or more video signals (or coded bit-streams) to a downstream device (e.g., EDR image decoder 105 of FIG. 1B). The coded image data may comprise base layer image data 112 of a lower bit depth (e.g., 8-bit), quantized from a higher bit depth (e.g., 12+ bits) EDR image 117 and carried in a coded base layer image container 125, and enhancement layer image data 152 comprising residual values between the EDR image 117 and a prediction frame 142 generated from the base layer image data. The base layer image data and the enhancement layer image data may be received and used by the downstream device to reconstruct the input EDR image (102 or 117).

In some embodiments, the coded base layer image data 125 may not be backward compatible to legacy coded SDR formats; instead, the base layer image data, together with the enhancement layer image data, is optimized for reconstructing high quality EDR images for viewing on EDR displays.

FIG. 1A depicts a layered EDR encoder architecture in accordance with an example embodiment. In an embodiment, all video coding in the base and enhancement coding layers may be performed in the YCbCr 4:2:0 color space. Each of the EDR image encoder 100 and the EDR image decoder 105 may be implemented by one or more computing devices.

The EDR image encoder (100) is configured to receive an input EDR image (102). As used herein, an "input EDR image" refers to wide or high dynamic range image data (e.g., raw image data captured by a high-end image acquisition device and the like) that may be used to derive an EDR version of the input image. The input EDR image 102 may be in any color space that supports a high dynamic range color gamut. In an embodiment, the input EDR image is a 12+ bit RGB image in an RGB color space. As used herein, for an image with multiple color components (e.g., RGB or YCbCr), the term n-bit image (e.g., 12-bit or 8-bit image) denotes an image where each pixel of its color components is represented by an n-bit pixel. For example, in an 8-bit RGB image, each pixel comprises of three color components, each color component (e.g., R, G, or B) is represented by 8-bits, for a total of 24 bits per color pixel.

Each pixel may optionally and/or alternatively comprise up-sampled or down-sampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

The EDR image encoder (100) may be configured to transform pixel values of the input EDR image 102 from a first color space (e.g., an RGB color space) to a second color space (e.g., a YCbCr color space). The color space transformation may be performed, for example, by a color transforms unit (115). The same unit (115) may also be configured to perform chroma subsampling (e.g., from YCbCr 4:4:4 to YCbCr 4:2:0).

EDR-to base layer quantizer (from now on to be referred to as BL quantizer, BLQ) 110 converts color-transformed EDR input V 117 to a BL image (112) of lower depth (e.g., an 8-bit image). As illustrated in FIG. 1A, both the 12+ bit EDR image (117) and the 8-bit BL image (112) are generated after the same chroma down-sampling and hence contain the same image content.

BL image encoder (120) is configured to encode/format the BL image (112) to generate a coded BL image 125. In some embodiments, the image data in the base layer image container is not for producing SDR images optimized for viewing on SDR displays; rather, the image data in the base layer image container is optimized to contain an optimal amount of base layer image data in a lower bit depth image container for the purpose of minimizing an overall bit requirement for the coded EDR image and to improve the overall quality of the final decoded image (197). BL encoder may be any of the known video encoders, such as those specified by the ISO/IEC MPEG-2, MPEG-4, part 2, or H.264 standards, or other encoders, such as Google's VP8, Microsoft's VC-1, and the like.

BL decoder (130) in the EDR image encoder (100) decodes the image data in the base layer image container into a decoded base layer image 135. Signal 135 represents the decoded BL as will be received by a compliant receiver. The decoded base layer image 135 is different from the BL image (112), as the decoded base layer image comprises coding changes, rounding errors and approximations introduced in the encoding and decoding operations performed by the BL encoder (120) and the BL decoder (130).

Predictor (or inverse BL quantizer) unit 140 performs one or more operations relating to predicting EDR signal 117 based on the decoded BL stream 135. The predictor 140 attempts to implement the reverse of operations performed in the BLQ 110. The predictor output 142 is subtracted from the EDR input 117 to generate residual 152.

In an example embodiment, an enhancement layer quantizer (EL quantizer, ELQ) 160 in the EDR image encoder (100) is configured to quantize the EDR residual values (152) from a 12+ bit digital representation to a lower digital representation (e.g., 8-bit images) using an ELQ function determined by one or more ELQ parameters. The ELQ function may be linear, piece-wise linear, or non-linear. Examples of non-linear ELQ designs are described in PCT application PCT/US2012/034747, "Non-linear VDR residual quantizer," filed Apr. 24, 2012, by G-M Su et al., which is incorporated herein by reference in its entirety.

Enhancement layer (EL) encoder 170 is configured to encode the residual values in an enhancement layer image container, the coded EL stream 172. EL encoder 170 may be any of the known video encoders, such as those specified by the ISO/IEC MPEG-2, MPEG-4, part 2, or H.264 standards, or other encoders, such as Google's VP8, Microsoft's VC-1, and the like. EL and BL encoders may be different or they may be the same.

The set of parameters used in BLQ 110 and ELQ 160 may be transmitted to a downstream device (e.g., the EDR image decoder 105) as a part of supplemental enhancement information (SEI) or other similar metadata carriages available in video bitstreams (e.g., in the enhancement layers) as metadata 144. As defined herein, the term "metadata" may relate to any auxiliary information that is transmitted as part of the coded bit-stream and assists a decoder to render a decoded image. Such metadata may include, but are not limited to, information as: color space or gamut information, dynamic range information, tone mapping information, or other predictor, up-scaling, and quantizer operators, such as those described herein.

FIG. 1B depicts a dual-layer EDR video decoder 105 according to an example embodiment. The decoder is configured to receive input video signals in multiple layers (or multiple bitstreams) comprising a base layer 125 and one or more enhancement layers (e.g., 172).

As depicted in FIG. 1B, BL decoder 180 is configured to generate, based on an input coded base layer video signal 125, a decoded base layer image 182. In some embodiments, BL decoder 180 may be the same, or substantially similar to, the BL decoder 130 in the EDR image encoder (100). BL decoded output 182 is passed to predictor (or inverse BL quantizer) 190 to generate an EDR estimate image 192. Predictor 190 may be the same or substantially similar to predictor 140. Predictor 190 may utilize input metadata 144 to extract needed prediction parameters.

An EL decoder 175, corresponding to the EL Encoder 170, is being used to decode received coded EL stream 172 to generate decoded quantized residual stream 177. The decoded stream 177 is passed to an inverse EL quantizer (IELQ) 185 to generate residual 187. Inverse ELQ 185 maps the 8-bit output of signal 177 to a 12+ bit residual 187, which is added to the predicted EDR stream 192 to generate a final decoded EDR signal 197, representing a close approximation of the original EDR signal 117. EDR signal 197 may also be post-processed by color transform and post-processing filters (not shown) to match the signal requirements required for rendering on a suitable EDR display.

As depicted in FIG. 1B, received metadata 144, comprising quantization parameters computed by the EDR encoder 100, may also be used by predictor 190 and inverse quantizer 185 during the decoding process 105.

Example Base Layer Quantizer

Figure 2:
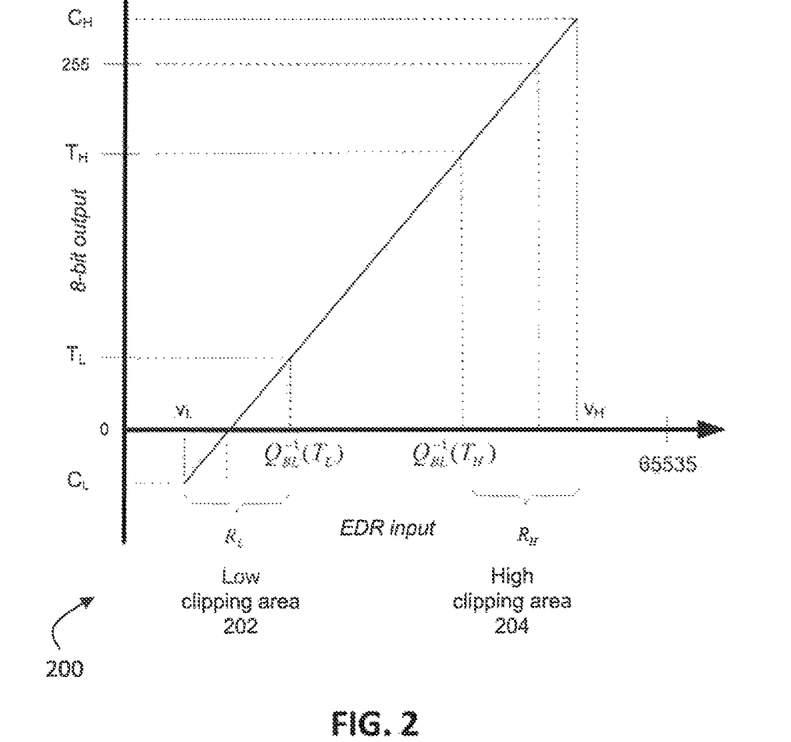
FIG. 2 depicts an example EDR to base layer quantization process according to an embodiment of the present invention.

FIG. 2 depicts an example BL quantizer (110) according to an embodiment. As depicted in FIG. 2, a range of input EDR values (e.g., $v_L$ to $v_H$) is mapped through a function to a range of quantized values (e.g., $C_L$ to $C_H$). While BLQ 200 depicts a linear quantizer, the methods discussed in this specification may be extended to other types of quantizers, including non-linear quantizers, or piece-wise linear quantizers. BLQ parameters, such as $C_H$, $C_L$, $v_H$, and $v_L$, may be adjusted at a variety of coding intervals; for example in every frame, in every scene, or in a group of pictures; however, in a preferred embodiment, to facilitate motion estimation, the $\{v_H, v_L\}$ parameters may remain the same for a whole scene, wherein as defined herein a "scene" denotes as a sequence of frames (or shots) of continuous action, where typically the individual frames in the scene share common dynamic range characteristics.

Denote with $v_i$ pixel values of a EDR input V (e.g., V 117 in FIG. 1A). The output $s_i$ of quantizer 200 may be expressed as $$s_i = Q_{BL}(v_i) = clip3\left(\left\lfloor \frac{C_H - C_L}{v_H - v_L}(v_i - v_L) + C_L + O_r \right\rfloor, T_L, T_H\right), \quad (1)$$

where $v_L$ and $v_H$ denote the minimum and maximum pixels values among the $v_i$ pixel values, $C_L$ and $C_H$ denote low-clipping and high-clipping output quantizer parameter values, $O_r$ denotes a rounding offset, i denotes the pixel index, and clip3( ) denotes a clipping function to limit the output value within a pair of thresholds $[T_H, T_H]$ (where normally $T_L=0$ and $T_H=255$). The pixels whose quantized value $s_i$ fall within $[T_L, T_H]$ are encoded in the base layer (BL), the remaining pixels are encoded in the enhancement layer (EL).

Figure 3:
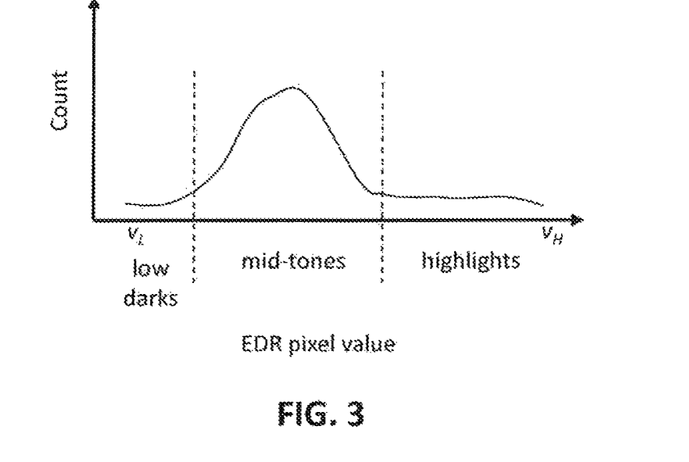
FIG. 3 depicts an example distribution of EDR pixels values.

FIG. 3 depicts an example distribution of luminance pixel values in an EDR picture. Pixels in a typical EDR picture may be segmented into three broad categories: the mid-tones, typically representing the majority of pixel values, the highlights, representing the brightest pixels, and the low darks, representing low levels of dark shades.

As illustrated in FIG. 2, given an input EDR image, the highlights part (204) and/or the low darks part (202) in the EDR picture are clipped and encoded in the EL, while the mid-tones (e.g., the pixel values between $Q_{BL}^{-1}(T_L)$ and $Q_{BL}^{-1}(T_H)$ remain in the BL. For a given group of pixels under consideration (e.g., within frame, picture region, or scene), the $\{v_H, v_L\}$ parameters represent the highest and lowest pixel values.

From equation (1), the de-quantization (prediction or inverse quantization) process in BL to EDR predictors 140 and 190, may be expressed as $$\bar{v}_i = Q_{BL}^{-1}(s_i) \quad (2)$$

$$= \frac{v_H - v_L}{C_H - C_L}(s_i - C_L) + v_L$$

$$= \left(\frac{v_H - v_L}{C_H - C_L}\right)s_i + \left(v_L - \left(\frac{v_H - v_L}{C_H - C_L}C_L\right)\right),$$

where $\overline{v}_i$ represents the estimate of $v_i$ at the output of the predictor.

ELQ Parameters as a Function of the BLQ Parameters

Figure 4:
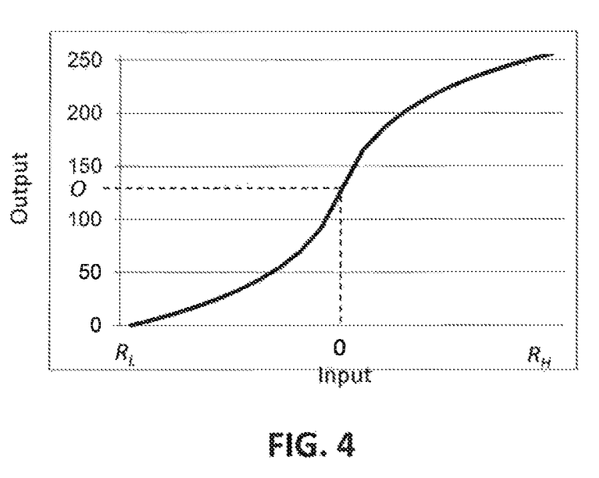
FIG. 4 depicts example input-output characteristics and parameters of an enhancement layer quantizer according to an embodiment of the present invention.

FIG. 4 depicts example input-output characteristics and parameters of an EL quantizer 160 according to an embodiment of the present invention. In some embodiments, quantizer 160 may be linear, piece-wise linear, or non-linear. ELQ 160 maps EDR residuals 152, typically having a bit depth of 12 bits or higher, into residuals 162 with a lower bit depth (e.g., 8-bits per pixel component) so that the EDR residual may be compressed using a legacy (e.g., 8-bit) EL encoder 170. In practice, quantizer 160 may be implemented as a look-up table mapping input values to output values according to the EL quantization function $Q_{EL}(\ )$. The design of $Q_{EL}(\ )$, may take into consideration several parameters, including: $R_{MAX}$, the maximum absolute value of the input residual (152), the number of available output code-words L (e.g., 256), and an offset keyword O representing the residual at 0 value (e.g., O=127). In an embodiment, these parameters are adjusted according to the parameters of the BL quantizer 110 to take full advantage of the expected changes in the dynamic range of EDR residuals 152.

As depicted in FIG. 2, when $C_H > 255$, the maximal EDR residual comes from clipping the highlights (brighter pixel values) and $$R_H = v_H - Q_{BL}^{-1}(T_H) \quad (3)$$

where, $Q_{BL}^{-1}$ denotes the inverse the BL quantization function. From equation (3), for a BL quantizer as defined by equation (2)

$$R_H = v_H - \left(\frac{v_H - v_L}{C_H - C_L}(T_H - C_L) + v_L\right). \quad (4)$$

When $C_L < 0$, the maximal EDR residual comes from clipping the lower dark values and $$R_L = Q_{BL}^{-1}(T_L) - v_L.$$

From equation (5), for a BL quantizer as defined in equation (2)

$$R_L = \left(\frac{v_H - v_L}{C_H - C_L}(T_L - C_L) + v_L\right) - v_L. \quad (6)$$

Taking into account that the BL quantizer may affect both the low darks and the highlights, the maximum absolute value of the input residual into the EL quantizer may be expressed as $$R_{max} = (1+\Delta)\max\{|R_H|, |R_L|\} \quad (7)$$

where $\Delta$ denotes an optional safety margin that takes into consideration distortions in the BL quantizer and the BL encoder. Experiments have shown that $\Delta=0.2$ works well for most cases of practical interest.

Figure 5:
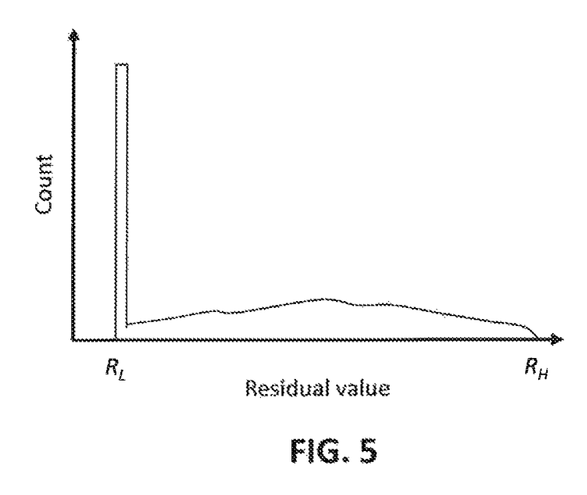
FIG. 5 depicts an example distribution of EDR residual values according to an embodiment of the present invention.

Intuitively, given the EDR encoder 100, for a fixed BL quantizer, one would expect the mean value of EDR residual signal 152 to be close to 0 and residuals to have a symmetric distribution across their mean; however, in practice, the range of the BL quantizer may be constantly adjusted to match the input characteristics, thus the distribution of residuals may be have a very one-sided distribution. FIG. 5 depicts an example distribution of residual values where the majority of residuals is concentrated around $R_L = 0$. By taking into account the distribution of residuals, a more efficient ELQ quantizer can be designed.

Given an 8-bit EL encoder 170, EL quantizer 160 should not output more than 256 possible values. However, in some embodiments one may want to restrict the number of levels even more, say to L. For a given BL quantizer 110, the L and O parameters of the ELQ quantizer may be defined as $$O = \frac{255 - 2\alpha}{R_H + R_L} R_L + \alpha, \quad (8)$$

and $$L = \frac{255 - 2\alpha}{1 + \delta} \frac{\max\{|R_H|, |R_L|\}}{R_H + R_L}, \quad (9)$$

where $\alpha$ and $\delta$ are again optional safety margin parameters (e.g., $\alpha=0$ and $\delta=0.1$).

Distortion Analysis for Fixed BL Quantization Parameters

In order to optimize the selection of BL and EL quantization parameters, a number of distortion measures are defined as follows. In some embodiments, for each quantizer, the corresponding distortion measure is proportional to the ratio of the input data range over the output data range.

Let $[C_H^{(n)}, C_L^{(n)}]$ denote n sets of $[C_H \ C_L]$ parameters for the BL quantizer 110. Given input data range $$R_{BL}^{(n)} = Q_{BL(n)}^{-1}(T_H) - Q_{BL(n)}^{-1}(T_L), \quad (10)$$

for the BL quantizer defined in equation (1), a distortion metric for the BL quantizer may be defined as $$g_{BL}^{(n)} = \frac{R_{BL}^{(n)}}{T_H - T_L} = \frac{v_H - v_L}{C_H^{(n)} - C_L^{(n)}}. \quad (11)$$

Hence, when $C_H^{(n)} - C_L^{(n)}$ increases, $g_{BL}^{(n)}$ decreases, and the BL distortion will be smaller.

Let $g_H^{(n)}$ and $g_L^{(n)}$ denote two distortion measures (or metrics) for the EL quantizer, one when highlights are clipped and one when low-darks (or simply lows) are clipped. Let $$g^{(n)} = \frac{R_{max}^{(n)}}{L^{(n)}}, \quad (12)$$

then, based on equations (4) (9), the high-clipping cost metric may be denoted as $$g_H^{(n)} = \frac{(1+\Delta)(v_H - v_L)(1+\delta)}{255 - 2\alpha}\left(\frac{C_H^{(n)} - T_H}{C_H^{(n)} - C_L^{(n)}}\right), \quad (13)$$

and the low-clipping cost metric may be denoted as $$g_L^{(n)} = \frac{(1+\Delta)(v_H - v_L)(1+\delta)}{255 - 2\alpha}\left(\frac{T_L - C_L^{(n)}}{C_H^{(n)} - C_L^{(n)}}\right). \quad (14)$$

From equations (11)-(14), increasing $C_H^{(n)}$ will increase $g_H^{(n)}$ and decrease $g_{BL}^{(n)}$. Similarly, decreasing $C_L^{(n)}$ will increase $g_L^{(n)}$ and decrease $g_{BL}^{(n)}$. When the clipping is dominated by clipping highlights (e.g., $C_L^{(n)}=0$) an overall joint BLQ-ELQ "high-clipping" cost distortion function (or metric) may be defined as $$G_H(C_H^{(n)}) = N_{BL}^{(n)} g_{BL}^{(n)} + N_{EL-H}^{(n)} g_H^{(n)}, \quad (15)$$

where $N_{EL-H}^{(n)}$ denotes the number of (highlight) pixels which for a given $C_H^{(n)}$ will be quantized in the enhancement layer; that is, $$N_{EL-H}^{(n)} = |\Phi_{EL-H}^{(n)}|, \quad (16)$$

and $$\Phi_{EL-H}^{(n)} = \{p | v_p \in [Q_{BL(n)}^{-1}(T_H), v_H]\}. \quad (17)$$

Similarly, in equation (15), $N_{BL}^{(n)}$ denotes the number of low dark pixels which will be quantized in the enhancement layer; that is $$N_{BL}^{(n)} = |\Phi_{BL}^{(n)}|, \quad (18)$$

where $$\Phi_{BL}^{(n)} = \{p | v_p \in [Q_{BL(n)}^{-1}(T_L), Q_{BL(n)}^{-1}(T_H))\}. \quad (19)$$

Then, the optimal $C^*_H$ may be found by searching for the value among the set of candidate $C_H^{(n)}$ values to minimize the $G_H(C_H^{(n)})$ cost function; that is, $$C^*_H = \arg\min_{\{C_H^{(n)}\}} G_H(C_H^{(n)}). \quad (20)$$

When the clipping is dominated by low-blacks clipping (e.g., $C_H^{(n)}=255$), an overall joint BLQ-ELQ "low-clipping" cost distortion function may be defined as $$G_L(C_L^{(n)}) = N_{BL}^{(n)} g_{BL}^{(n)} + N_{EL-L}^{(n)} g_L^{(n)}, \quad (21)$$

where $N_{EL-L}^{(n)}$ denotes the number of pixels that will be quantized in the enhancement layer stream for a given choice of $C_L^{(n)}$; that is, given $$\Phi_{EL-L}^{(n)} = \{p | v_p \in [v_L, Q_{BL(n)}^{-1}(T_L)]\}, \quad (22)$$

then $$N_{EL-L}^{(n)} = |\Phi_{EL-L}^{(n)}|. \quad (23)$$

Given (21), an optimal $C^*_L$ may be found by searching for the value among the set of candidate $C_L^{(n)}$ values that minimizes the $G_L(C_L^{(n)})$ cost function; that is $$C^*_L = \arg\min_{\{C_L^{(n)}\}} G_L(C_L^{(n)}). \quad (24)$$

Some embodiments may also apply different cost functions. For example, in some embodiments the joint BLQ-ELQ cost function for clipping the lows may be defined using second-order terms, as in $$G_L(C_L^{(n)}) = N_{BL}^{(n)} g_{BL}^{(n)} g_{BL}^{(n)} + N_{EL-L}^{(n)} g_L^{(n)} g_L^{(n)}. \quad (25)$$

Regardless of the joint cost function being used, one may determine the optimal $C^*_L$ and $C^*_H$ values in the BL quantizer as follows:
if $G_L(C^*_L) < G_H(C^*_H)$, then select low clipping as the dominant clipping and choose $C^*_L$ else select high clipping as the dominant clipping and choose $C^*_H$.

Figure 6:
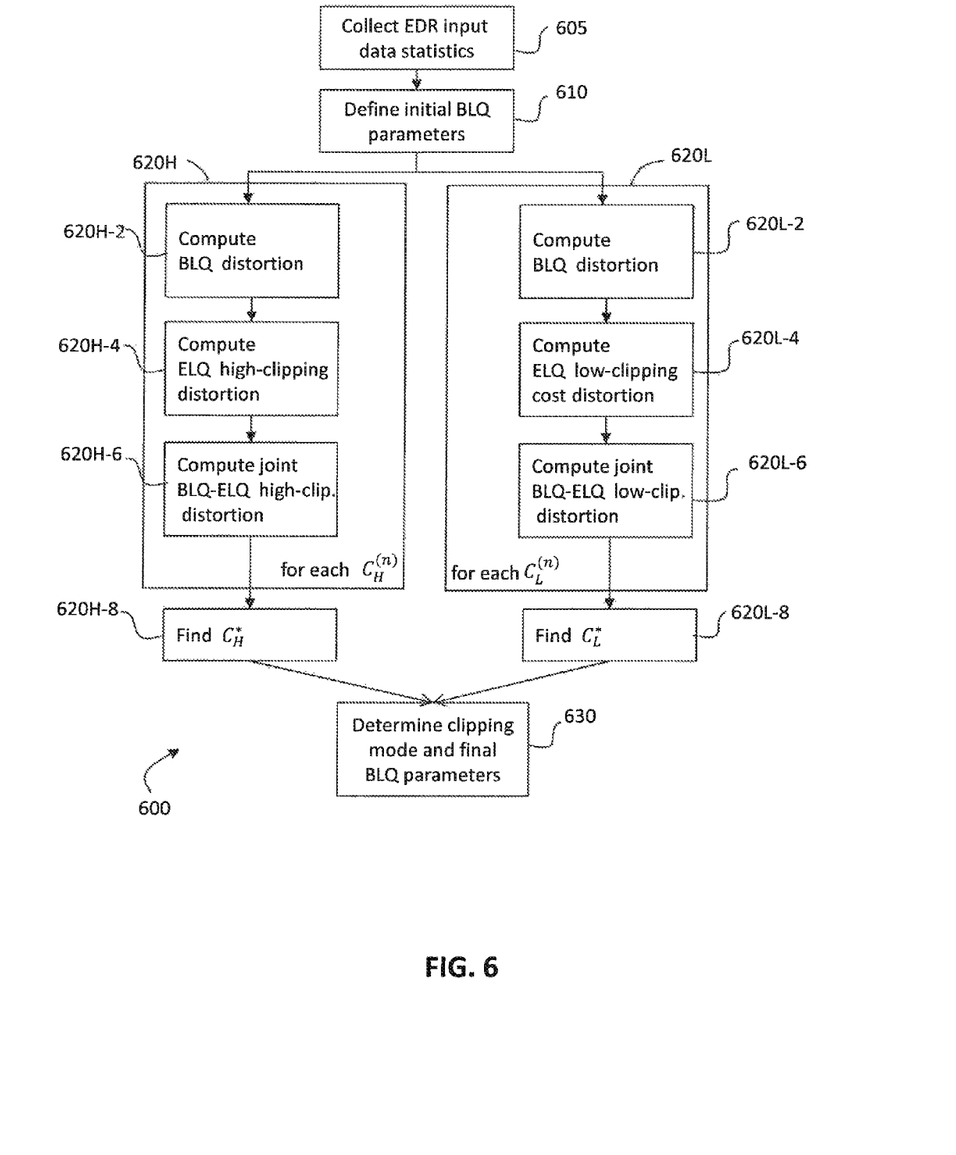
FIG. 6 depicts an example process for joint adaptation of the base layer and enhancement layer quantizers according to an embodiment of the present invention.

FIG. 6 depicts an example process 600 for the joint adaptation of the BL and EL quantizers according to an embodiment. The process may begin in step 605 by collecting statistics related to the input data $v_i$ 117 under consideration for quantization. Such data include:

- The minimum $v_L$ and maximum $v_H$ values
- Generating a histogram (also referred to as probability density function, PDF) of the $v_i$ pixel values
- Based on the PDF, generating a cumulative distribution function (CDF) so that one can compute the number of input pixel values within a certain range In step 610, one may define the initial $T_H$ and $T_L$ values (e.g., $T_H=255$, $T_L=0$). To find the remaining BLQ parameters (e.g., $C_L$ and $C_H$), process 600 may be split in two processing branches: the high-clipping branch 620H and the low-clipping branch 620L. An encoder may select to perform operations only in one of the two branches, or it may select to perform the operations in both branches. The operations in the two branches may be performed sequentially or in parallel.

The high-clipping processing branch 620H assumes $C_L$ is fixed (e.g., $C_L=0$) and uses a number of iterative steps to find the preferred $C_H$ among a series of candidate $C_H^{(n)}$ values. Similarly, the low-clipping processing branch 620L assumes $C_H$ is fixed (e.g., $C_H=255$) and uses a number of iterative steps to find the preferred output $C_L$ among a series of candidate $C_L^{(n)}$ values. The number of candidates $C_H^{(n)}$ and $C_L^{(n)}$ values may depend on a variety of factors, including: prior quantization parameters, input metadata, available processing power, and the like. For example, without loss of generality, an embodiment may consider as $C_H^{(n)}$ the set of {255, 260, ..., 700} and as $C_L^{(n)}$ the set of {−600, −595, ..., 1}.

For each of the candidate $C_H^{(n)}$ values, the high-clipping processing branch 620H comprises the following steps:

- (step 620H-2) Compute a BLQ distortion value using a BLQ distortion metric, e.g., $g_{BL}^{(n)}$ in equation (11)
- (step 620H-4) Compute an ELQ distortion value using a "high-clipping" distortion metric; e.g., $g_H^{(n)}$ of equation (13), and
- (step 620H-6) Compute a joint BLQ-ELQ distortion value using a "high-clipping" distortion metric; e.g., compute $G_H(C_H^{(n)})$ using equations (15)-(19) based on the pre-computed CDF of the input data in step 605

Finally, from equation (20), an output $C_H$ can be derived, such as $$C^*_H = \arg\min_{\{C_H^{(n)}\}} G_H(C_H^{(n)})$$

For each of the candidate $C_L^{(n)}$ values, the low-clipping processing branch 620L comprises the following steps:

- (step 620L-2) Compute a BLQ distortion value using on a BLQ distortion metric; e.g., $g_{BL}^{(n)}$ of equation (11)
- (step 620L-4) Compute an ELQ distortion value using on a "low-clipping" distortion metric; e.g., $g_L^{(n)}$ of equation (14), and
- (step 620L-6) Compute a joint BLQ-ELQ distortion value using a "low-clipping" distortion metric; e.g., $G_L(C_L^{(n)})$ computed using equations (21)-(25) and the pre-computed CDF of the input data in step 605

Finally, from equation (24), an output $C_L$ can be derived as $$C_L^* = \arg\min_{\{C_L^{(n)}\}} G_L(C_L^{(n)})$$

Some embodiments may utilize alternative distortion test criterions to determine the output $C_L$ and $C_H$ values. For example, assuming a monotonic increase (or decrease) of candidate $C_L$ values, an embodiment may use a local-minima criterion, where it outputs $C^*_L = C_L^{(n)}$ and terminates loop computations if $$G_L(C_L^{(n-1)}) > G_L(C^*_L) \text{ and } G_L(C^*_L) < G_L(C_L^{(n+1)}).$$

Similarly assuming a monotonic increase (or decrease) of candidate $C_H$ values, an embodiment may use a local-minima criterion, where it outputs $C^*_H = C^*_H{}^{(n)}$ and terminates loop computations if $$G_H(C_H^{(n-1)}) > G_H(C^*_H) \text{ and } G_H(C^*_H) < G_H(C_H^{(n+1)}).$$

Assuming a single dominant clipping (low or high), the dominant clipping mode and final BLQ parameters may be selected as follows (step 630):
if $G_L(C^*_L) < G_H(C^*_H)$, then select low clipping as the dominant clipping (e.g., $C_L = C^*_L$ and $C_H = 255$)
else select high clipping as the dominant clipping (e.g., $C_L = 0$ and $C_H = C^*_H$)
In another embodiment, one may consider simultaneous dual clipping. In such a scenario the joint BLQ-ELQ adaptation process needs to operate on pairs of $C_H^{(n)}$ and $C_L^{(n)}$ values. For example, for each $C_H^{(n)}$ value, an encoder may attempt to test each one of the $C_L^{(n)}$ values. For example, if each of these sets comprise N possible candidate values, while process 600 may require 2N iterations, under this embodiment the joint adaptation method may require $N^2$ iterations; thus this optimization adaptation process may be very compute intensive. Table 1 depicts in pseudo code an example joint BLQ-ELQ adaptation according to an embodiment.

TABLE 1

Joint BLQ-ELQ adaptation with simultaneous low and high clipping
STEP 0:
  Obtain histogram (PDF) of $v_i$
  Calculate CDF based on PDF
  Determine $v_H$ and $v_L$
  Select $T_H$ and $T_L$ (e.g., , $T_H=255$, $T_L=0$)
STEP 1:
For each pair of $\{C_L^{(n)}, C_H^{(n)}\}$ values under consideration:
start $$Q_{BL(n)}^{-1}(T_H) = \left(\frac{v_H - v_L}{C_H^{(n)} - C_L^{(n)}}(T_H - C_L^{(n)}) + v_L\right)$$

$$Q_{BL(n)}^{-1}(T_L) = \left(\frac{v_H - v_L}{C_H^{(n)} - C_L^{(n)}}(T_L - C_L^{(n)}) + v_L\right)$$

$N_{EL\_L}^{(n)} = \text{cdf}(Q_{BL(n)}^{-1}(T_L))$ // $N_{EL\_L}^{(n)}$: number of low-clipped pixels is computed via the CDF function of STEP 0;
$N_{BL}^{(n)} = \text{cdf}(Q_{BL(n)}^{-1}(T_H)) - \text{cdf}(Q_{BL(n)}^{-1}(T_L))$ // $N_{BL}^{(n)}$: number of BL-coded pixels is computed via CDF function;
$N_{EL\_H}^{(n)} = 1 - \text{cdf}(Q_{BL(n)}^{-1}(T_H))$ // $N_{EL\_H}^{(n)}$: number of high-clipped pixels is computed via CDF function;
$N_{DE}^{(n)} = N_{EL\_L}^{(n)} + N_{EL\_H}^{(n)}$     // Total number of pixels in the EL Layer $$g_{BL}^{(n)} = \frac{R_{BK}^{(n)}}{T_H - T_L} = \frac{v_H - v_L}{C_H^{(n)} - C_L^{(n)}} \text{ // BLQ distortion metric;}$$

$$g_{DE}^{(n)} = \frac{(1+\Delta)(1+\delta)}{255 - 2\alpha} \frac{v_H - v_L}{C_H - C_L}\{(T_L - C_L^{(n)}) + (C_H^{(n)} - T_H)\} \text{ // Dual-ended ELQ distortion metric;}$$

$G(C_L^{(n)}, C_H^{(n)}) = N_{BL}^{(n)} g_{BL}^{(n)} + N_{DE}^{(n)} g_{DE}^{(n)}$ // Joint BLQ-ELQ distortion metric;
end $\{C_L^*, C_H^*\} = \arg\min_{\{C_H^{(n)}, C_L^{(n)}\}} G(C_L^{(n)}, C_H^{(n)})$ // Find output pair among all candidate pairs This process is very similar to process 600, except that instead of computing two single-ended ELQ distortion metrics ($g_H^{(n)}$ and $g_L^{(n)}$), one computes a dual-ended ELQ distortion metric given by $$g_{DE}^{(n)} = \frac{(1+\Delta)(1+\delta)}{255 - 2\alpha} \frac{v_H - v_L}{C_H - C_L}\{(T_L - C_L^{(n)}) + (C_H^{(n)} - T_H)\}. \quad (26)$$

Layer Decomposition for Chroma Components

As described earlier, in coding EDR video signals using a layered coding system, (e.g., as the one depicted in FIG. 1A), during the joint BL/EL decomposition phase, a picture is quantized so that very bright or very dark areas are encoded as part of the enhancement layer, while mid-tones are coded as part of the base layer. In one embodiment, the EL may comprise only luminance values, while the BL may comprise a clipped luminance value and the associated chroma values.

For example, for an input $v_i$, comprising, without loss of generality, a luma component $v_i^y$ and chroma components $v_i^{Cb}$ and $v_i^{Cr}$, consider a picture area with input luminance values $v_i^y$ to be quantized to the BL signal values $s_i^y=255$. After applying a luminance quantizer as depicted in FIG. 2, one may have the following pixel values in the two layers:

$$\text{In } BL: s_{BL,i}^y=255, s_{BL,i}^{Cb}=Q_{BL}^{Cb}(v_i^{Cb}), s_{BL,i}^{Cr}=Q_{BL}^{Cr}(v_i^{Cr}), \text{ and} \quad (27)$$

$$\text{In } EL: s_{EL,i}^y=Q_{EL}^y(v_i^y-Q_{BL}^{-1,y}(255)), s_{EL,i}^{Cb}\approx 0, s_{EL,i}^{Cr}\approx 0. \quad (28)$$

Thus, in this example, all chroma information is coded in the base layer, while luminance residual values above 255 and some small chroma residuals (due to potential chroma prediction errors) are coded in the enhancement layer.

In modern video codecs, as the ones described in the MPEG AVC/H.264 or HEVC specifications, a macroblock (MB) is defined as a collection of both luminance (luma) and chroma values. To improve coding efficiency, luma and chroma components within a macroblock typically share multiple variables, such as quantization parameter values (e.g., QP), the coding mode (e.g., inter or intra), and motion vectors. In most cases, an encoder will make coding decisions based on the luminance values and will ignore the chroma values. This approach performs well for natural images, but may fail when the luminance values are clipped. For example, given a large clipped luma area, the motion vectors of a macroblock in that area often tends to become zero, as there is no perceived motion on those pure constant luma areas, which forces the corresponding chroma components to be encoded in intra coding mode, with a higher QP. Furthermore, some MBs may be coded as skip mode MBs during the mode decision. Consequently, the chroma components in the luma-clipped areas may show significant coding artifacts, such as blocking artifacts and/or ringing artifacts.

In one embodiment, one may alleviate the high quantization in chroma by using separate luma and chroma QP values. For example, in AVC coding, one may use the parameter chroma_qp_offset, which allows an encoder to set a chroma QP in terms of the luma QP. For example, one may set chroma_qp_offset=−12 to force chroma QP values to be lower than the luma QP values. However, chroma_qp_offset is a picture-level flag; that is, it applies to the whole frame, hence, other unclipped areas within a frame will use unnecessarily low QP values, which may result in overall higher bit rate.

Thus, as recognized by the inventors, there is a need to adjust the layered decomposition of the chroma components so that it takes into consideration decisions related to the layered decomposition of their corresponding luma values. Two such decomposition methods are described next.

Layered Decomposition of Chroma Based on Separation Thresholds

Given a set of pixel values for which the encoder has already determined that the luminance values need to be encoded in the EL, in one embodiment, the encoder may decide to encode all corresponding chroma pixel values in the EL as well. For example, from equations (27) and (28), one way to code the BL and EL layers would be:

$$\text{In } BL: s_{BL,i}^y=255, s_{BL,i}^{Cb}=D1, s_{BL,i}^{Cr}=D2, \text{and} \quad (29)$$

$$\text{In } EL: s_{EL,i}^y=Q_{EL}^y(v_i^y-Q_{BL}^{-1,y}(255)), s_{EL,i}^{Cb}=Q_{EL}^{Cb}-Q_{BL}^{-1,Cb}(D1)), s_{EL,i}^{Cr}=Q_{EL}^{Cr}(v_i^{Cr}-Q_{BL}^{-1,Cr}(D2)), \quad (30)$$

where D1 and D2 are constants selected to minimize the residual error values in the chroma components. Such an approach may work; however, it also forces unnatural sharp edges between the BL and EL coding areas in the chroma, which may yield chroma artifacts in the decoded stream. In a preferred embodiment, given a luma mask, that is a mask that defines which luminance values will be coded in the EL, an encoder may not code all the corresponding chroma values in the EL as well. Instead, it may try to identify a subset that will be coded in the EL, while the remaining chroma pixels will be coded in the BL. The following operations may be performed separately for each of the chroma components (e.g., Cb and Cr).

Figure 7A:
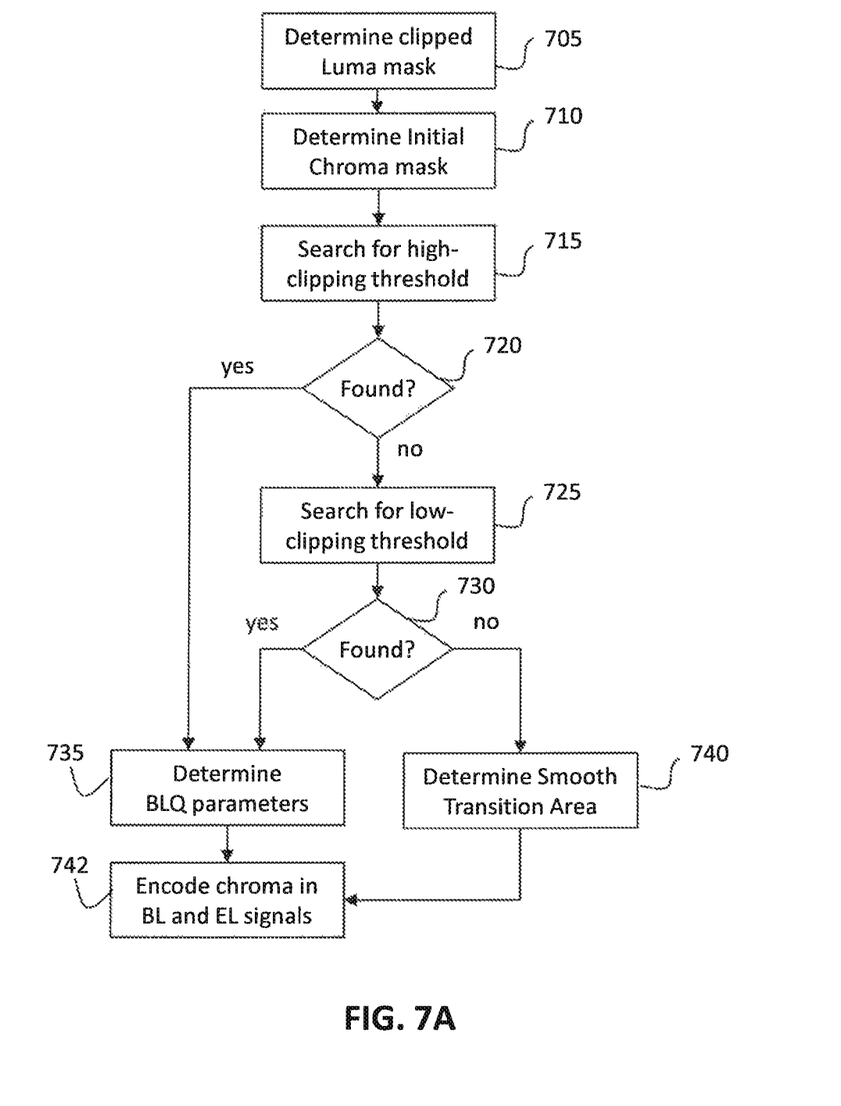
FIG. 7A and FIG. 7B depict example processes for the separation of chroma values in a layered encoder according to an embodiment of the present invention.

FIG. 7A depicts an example process for the separation and coding of chroma components in an EDR layered system (e.g., 100) according to an embodiment. Denote as $p^l$ the total number of pixels in the luma channel. Denote the i-th pixel in the luma component as $v_i^l \in [0, L_H]$, where $L_H$ denotes the highest possible luma value, e,g., $L_H=65{,}535$. Denote as $c_i^l \in [0, L_H^{BL}]$ its corresponding pixel value in the BL, where $L_H^{BL}$ denotes the maximum allowed pixel value in the BL, e.g., 255 for an 8-bit encoder. Denote by $p^c$ the total number of pixels in one chroma channel, where the i-th pixel in the chroma component is denoted as $v_i^c$. For example, for the 4:2:0 chroma format, $p^l=4p^c$. Let $v_{max}^c=\max\{v_i^c, \forall i\}$ denote the maximal value in the considered color plane in the current frame (or in the entire scene). Let $v_{min}^c=\min\{v_i^c, \forall i\}$ be the minimal value in the considered color plane in the current frame (or in the entire scene).

As depicted in FIG. 7A, the first step (705) in the process is to identify the clipped luma pixels. Clipped luma pixels may be identified using a luma mask, which in one embodiment may be determined as follows. Let the Boolean expression for this mask be denoted as:

$$m_i^l = \begin{cases} 1 & \text{if } c_i^l = T_l \\ 0 & \text{otherwise.} \end{cases}$$

That is, $$m_i^l \in \{0,1\}.$$

$T_l$ denotes a predetermined threshold. For example, in one embodiment, during luma high clipping $T_l=255$, and during luma low clipping $T_l=0$. Then, a clipping map $M^l$ may be defined as $$M^l=[m_i^l].$$

When chroma is sub-sampled, that is, $p^l \neq p^c$, the luma clipping map $M^l$ needs to also be resampled to match the size of the down-sampled chroma component. Let $$\tilde{M}^c=\text{downsample}(M^l)$$

denote the down-sampled clipped-luma mask. The down-sample( ) function can be similar to the down-sampling function being used to determine the pictures chroma pixels, e.g., from YCbCr 4:4:4 to YCbCr 4:2:0. After the down-sampling, the elements, $\tilde{m}_i^c$, in $\tilde{M}^c$ may not be Boolean values. Then, a simple thresholding operation, such as $$m_i^c=(\tilde{m}_i^c>0),$$

may be used to determine the initial chroma mask (710)

$$M^c=[m_i^c].$$

Denote as $\phi^{(0)}$ an initial set for which the chroma mask values equal to 1. Then $$\phi^{(0)}=\{i | m_i^c=1, \forall i\}.$$

Denote the number of pixels having chroma mask value as 1 in $M^c$ as $$p^{(0)} = \sum_{i=0}^{p^c} m_i^c = |\Phi^{(0)}|.$$

Denote as $\Omega$ the set containing pixel with chroma mask value 0, then $$\Omega = \{i | m_i^c = 0, \forall i\}.$$

Let $v_{max}^{(0)} = \max\{v_i^c, \forall i \in \Phi^{(0)}\}$ denote the maximal value within the set $\Phi^{(0)}$ and let $v_{min}^{(0)} = \min\{v_i^c, \forall i \in \Phi^{(0)}\}$ denote the minimal value within the set $\Phi^{(0)}$, then in one embodiment, a search for a separation threshold for the layer decomposition of the chroma channels (either high-clipping 715 or low-clipping 725) may be computed as follows.

High-Clipping Threshold Search

In this step (715), the algorithm searches iteratively for a separation value (or threshold) $v_{sv}^c$ which is lower than a subset of the chroma pixel values defined by the initial chroma mask. The chroma pixel values above $v_{sv}^c$ will then be coded in the EL while the rest will be coded in the BL. In an embodiment, starting from $v_{sv}^c = v_{min}^{(0)}$, during each iteration, a new value is assigned to $v_{sv}^c$ (e.g., $v_{sv}^c \in [v_{min}^{(0)}, v_{max}^{(0)}]$) and an updated chroma mask is computed. For example, during the n-th iteration, the updated mask is defined as:

$$\Phi^{(n)} = \{i | v_i^c \geq v_{sv}^c, \forall i\}.$$

If $m_i^{(n)}$ denotes whether pixel i belongs to $\Phi^{(n)}$, then $$m_i^{(n)} = \begin{cases} 1, & \text{if } v_i^c \geq v_{sv}^c \\ 0, & \text{otherwise.} \end{cases}$$

The purpose of this search is to identify a subset of pixels belonging to $\Phi^{(0)}$, but with chroma pixel values that can't be found in $\Omega$. Mathematically, this can be expressed as follows: for $$\Phi^{(n)} \subset \Phi^{(0)},$$

search for $\Phi^{(n)}$ so that $$\Psi^{(n)} = \Phi^{(n)} \cap \Omega$$

is an empty set, or in practice, a near-empty set. This can be computed as $$|\Psi^{(n)}| == |\Phi^{(n)} \cap \Omega| == \sum_{i=0}^{p^c} (m_i^c == 0) \cdot (m_i^{(n)} == 1).$$

If $|\Psi^{(n)}| > 0$, then the process is repeated for a new value of $v_{sv}^c$. If $|\Psi^{(n)}| = 0$, then $v_{sv}^c$ may be used to determine the BL quantizer parameters for the chroma component in step 735. Note however, that determining such a threshold is not guaranteed. In that case, the algorithm may attempt to determine a low-clipping threshold in step 725.

In determining a threshold, coding efficiency should also be taken into consideration. If the number of clipped chroma pixels is much lower than the number of clipped luma pixels, then a large number of chroma pixels still needs to be encoded in the BL, which contradicts our initial goal. Hence, in an embodiment, a more appropriate test for determining whether a high-clipping threshold has been found is to test also whether $$|\Phi^{(n)}| > \alpha |\Phi^{(0)}|,$$

where $\alpha$ may be approximately equal to 0.5.

Figure 8A:
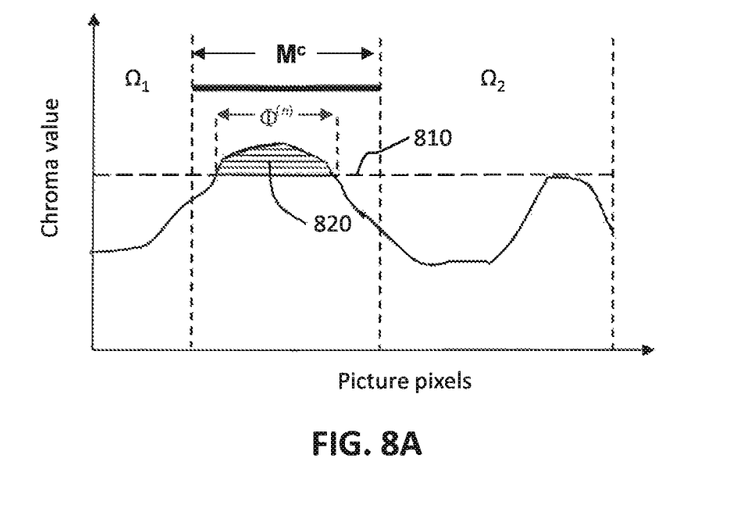
FIG. 8A depicts an example of determining a high-clipping threshold during chroma decomposition according to an embodiment of the present invention.

FIG. 8A depicts an example of determining a high-clipping threshold according to an embodiment. For demonstration purposes, FIG. 8A depicts a 1-D view of the process. As denoted in FIG. 8A, $M^c$ denotes the original chroma mask and $\Omega = \Omega_1 \cup \Omega_2$. After n iterations, line 810 may define the value of the high-clipping threshold. Chroma pixel values within the final mask (e.g., 820), will be coded as part of the EL signal, while the remaining chroma pixel values will be coded as part of the BL signal.

Low Clipping Threshold Search

In case the search for a high-clipping threshold fails, then a new search for a low-clipping threshold may be initiated in step 725. As before, in each iteration, a new threshold value of $v_{sv}^c$ is selected, such that $v_{sv}^c \in [v_{min}^{(0)}, v_{max}^{(0)}]$. Based on the selected threshold, a new chroma mask for chroma pixels to be clipped is determined. For example, at the n-th iteration, the updated chroma mask may be defined as $$\Phi^{(n)} = \{i | v_i^c \leq v_{sv}^c, \forall i\}$$

If $m_i^{(n)}$ denotes whether pixel i belongs to $\Phi^{(n)}$, then $$m_i^{(n)} = \begin{cases} 1, & \text{if } v_i^c \leq v_{sv}^c \\ 0, & \text{otherwise.} \end{cases}$$

Given $$|\Psi^{(n)}| == |\Phi^{(n)} \cap \Omega| == \sum_{i=0}^{n^c} (m_i^c == 0) \cdot (m_i^{(n)} == 1),$$

if $|\Psi^{(n)}| = 0$ (or close to 0), then $v_{sv}^c$ may be used to determine the low-clipping threshold. Chroma pixel values below the low-clipping threshold will be coded in the EL layer while the remaining chroma pixel values will be encoded in the BL. Note however, that determining such a threshold is not guaranteed. In that case, the algorithm may attempt to determine the chroma values to be coded in the EL using a smooth transition area algorithm (740), as will be described later on in this specification.

While the process of FIG. 7A depicts a low-clipping threshold search to follow the high-clipping search, in one embodiment these steps may be reversed. Some embodiments may also completely skip both steps and simply determine the chroma pixels using the smooth transition area algorithm 740. Note also that a video frame or picture may comprise multiple areas of clipped luminance values. In such cases, the processes described herein may be repeated for each of those areas.

Table 1 lists in pseudo-code an example implementation of steps in FIG. 7A, according to one embodiment.

TABLE 1

Determining Chroma Separation Thresholds

```
// Output:
//    cilp_dir : clipping direction; [−1]: low clipping, [1] high clipping,
         [0] cannot
//    determine separation threshold
//    v_sv^c   : separation value
```

TABLE 1-continued

Determining Chroma Separation Thresholds

```
// Initialization
cilp_dir = 0;
calculate v_min^(0) and v_max^(0)
choose α (ratio between clipping luma/chroma) and Δ(search step size)
compute initial chroma clipping mask Φ^(0) and unclipping mask Ω
// try high clipping
b_search_flag = 1;
v_sv^c = v_min^(0)
n = 0;
while( b_search_flag ){
    n++;
    Φ^(n) = {i|v_i^c ≥ v_sv^c, ∀i}
    p^(n) =| Φ^(n) |
    Ψ^(n) = Φ^(n) ∩ Ω
    If(   | Ψ^(n) | == 0 ){
        cilp_dir = ( p^(n) > α · p^(0) ) ? 1 : 0
        b_search_flag = 0;
        return
    }
    else{
        v_sv^c + = Δ   // increment the threshold value
        If(  v_sv^c > v_max^(0) ){
            b_search_flag = 0;
        }
    }
}
// try low clipping
b_search_flag = 1;
v_sv^c = v_max^(0)
n = 0;
while( b_search_flag ){
    n++;
    Φ^(n) = {i|v_i^c ≤ v_sv^c, ∀i}
    p^(n) =| Φ^(n) |
    Ψ^(n) = Φ^(n) ∩ Ω
    If(   | Ψ^(n) | == 0 ){
        cilp_dir = ( p^(n) > α · p^(0) ) ? -1 : 0
        b_search_flag = 0;
        return
    }
    else{
        v_sv^c - = Δ // decrement the threshold value
        If(  v_sv^c < v_min^(0) ){
            b_search_flag = 0;
        }
    }
}
```

Quantization of Chroma Channels Based on Separation Thresholds

FIG. 7A depicts a process to identify which chroma pixels may be coded in the BL stream and which may be coded in the EL stream. Given a set of chroma pixel values determined by this process, this chroma decomposition process may be followed by a chroma quantization process (735). Given a quantizer as depicted in FIG. 2, from equation (1), each color component (e.g., Cb, Cr) may be quantized using similar equations, such as $$s_i^{Cb} = Q_{BL}^{Cb}(v_i^{Cb}) = \qquad (31)$$

$$clip3\left(\left\lfloor \frac{C_H^{Cb} - C_L^{Cb}}{v_H^{Cb} - v_L^{Cb}}(v_i^{Cb} - v_L^{Cb}) + C_L^{Cb} + O_r^{Cb} \right\rfloor, T_L^{Cb}, T_H^{Cb}\right),$$

and $$s_i^{Cr} = \qquad (32)$$

$$Q_{BL}^{Cr}(v_i^{Cr}) = clip3\left(\left\lfloor \frac{C_H^{Cr} - C_L^{Cr}}{v_H^{Cr} - v_L^{Cr}}(v_i^{Cr} - v_L^{Cr}) + C_L^{Cr} + O_r^{Cr} \right\rfloor, T_L^{Cr}, T_H^{Cr}\right),$$

where, without loss of generality, a color channel is indicated as a superscript. Equations (31) and (32) can be fully defined by determining the BLQ chroma quantization parameters $\{C_H^{Cb}, C_L^{Cb}\}$ and $\{C_H^{Cr}, C_L^{Cr}\}$.

Let the dynamic range for each color component in the BL signal be defined as $$DR_{BL}^Y = C_H^Y - C_L^Y,$$

$$DR_{BL}^{Cb} = C_H^{Cb} - C_L^{Cb},$$

$$DR_{BL}^{Cr} = C_H^{Cr} - C_L^{Cr}, \qquad (33)$$

Let also the dynamic range for each color component in the EDR signal be defined as $$DR_{EDR}^Y = v_H^Y - v_L^Y,$$

$$DR_{EDR}^{Cb} = v_H^{Cb} - v_L^{Cb},$$

$$DR_{EDR}^{Cr} = v_H^{Cr} - v_L^{Cr}, \qquad (34)$$

In an embodiment, the dynamic range of the BL signal may be expressed in terms of the dynamic range in the EDR stream, such as $$DR_{BL}^{Cb} = \beta^{Cb} \cdot DR_{BL}^Y \cdot \frac{DR_{EDR}^{Cb}}{DR_{EDR}^Y}, \qquad (35)$$

$$DR_{BL}^{Cr} = \beta^{Cr} \cdot DR_{BL}^Y \cdot \frac{DR_{EDR}^{Cr}}{DR_{EDR}^Y},$$

where $\beta^{Cb}$ and $\beta^{Cr}$ are optional constants that can be used to control the quantizer. In an embodiment, $\beta^{Cb} = \beta^{Cr} = 1$.

Then, the initial value of $\{C_H^{Cb}, C_L^{Cb}\}$ and $\{C_H^{Cr}, C_L^{Cr}\}$ can be derived as $$C_H^{Cb} = \text{round}\left(127.5 + \frac{DR_{BL}^{Cb}}{2}\right), \qquad (36)$$

$$C_L^{Cb} = \text{round}\left(127.5 - \frac{DR_{BL}^{Cb}}{2}\right),$$

$$C_H^{Cr} = \text{round}\left(127.5 + \frac{DR_{BL}^{Cr}}{2}\right),$$

$$C_L^{Cr} = \text{round}\left(127.5 - \frac{DR_{BL}^{Cr}}{2}\right).$$

Note that, potentially, clip3( ) operations may be needed to constrain the chroma range of equation (36) within valid values (e.g., 0 to 255).

Given $\{C_H^{Cb}, C_L^{Cb}\}$ and $\{C_H^{Cr}, C_L^{Cr}\}$, the separation value determined earlier, may be expressed as:

$$C_{sv}^{Cb} = C_L^{Cb} + DR_{BL}^{Cb} \frac{(v_{sv}^{cb} - v_L^{cb})}{DR_{EDR}^{Cb}}, \qquad (37)$$

$$C_{sv}^{Cr} = C_L^{Cr} + DR_{BL}^{Cr} \frac{(v_{sv}^{cr} - v_L^{cr})}{DR_{EDR}^{Cr}}.$$

These two values (e.g., $C_{sv}^{Cb}$ and $C_{sv}^{Cr}$) may control a shifting offset. The value of this shifting offset depends on whether high clipping or low clipping is performed (see FIG. 2). For high clipping, BL values are shifted upwards, so that the original vales larger than $C_{sv}^{Cb}$ and $C_{sv}^{Cr}$ are clipped to 255. A shifting offset may be computed as:

$$C_{offset}^{Cb}=255-C_{sv}^{Cb},$$

$$C_{offset}^{Cr}=255-C_{sv}^{Cr}, \qquad (38)$$

For low clipping, BL values are shifted downwards, such that the original values less than $C_{sv}^{Cb}$ and $C_{sv}^{Cr}$ are clipped to 0. A shifting offset may be computed as:

$$C_{offset}^{Cb}=-C_{sv}^{Cb},$$

$$C_{offset}^{Cr}=-C_{sv}^{Cr}, \qquad (39)$$

Given these offsets, BLQ parameters $\{C_H^{Cb}, C_L^{Cb}\}$ and $\{C_H^{Cr}, C_L^{Cr}\}$ may be adjusted as:

$$C_H^{Cb}=\text{round}(C_H^{Cb}+C_{offset}^{Cb}),$$

$$C_L^{Cb}=\text{round}(C_L^{Cb}+C_{offset}^{Cb}),$$

$$C_H^{Cr}=\text{round}(C_H^{Cr}+C_{offset}^{Cr}),$$

$$C_L^{Cr}=\text{round}(C_L^{Cr}+C_{offset}^{Cr}), \qquad (40)$$

Quantization of Chroma Channels Based on Smooth Transition Area Search

Figure 7B:
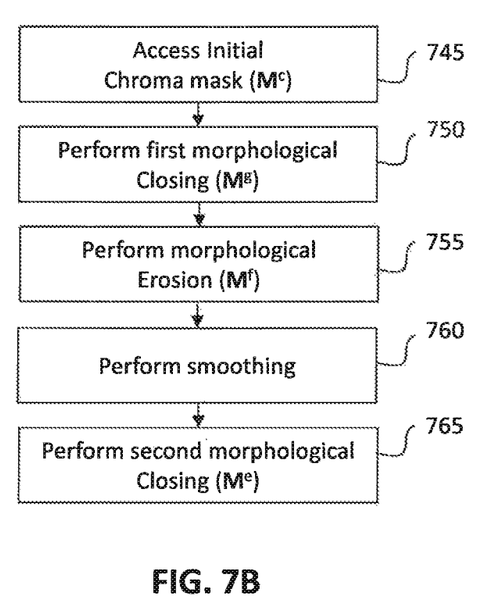

As noted earlier, coding in the EL all chroma values that correspond to an area of luma samples may yield sharp chroma edges that are hard to compress and may result in a variety of chroma artifacts. In an embodiment, FIG. 7B depicts an example process for determining and coding chroma pixels in a smooth transition area (e.g., step 740).

Given the original chroma mask (e.g., $M^c$, as computed in step 710), for each chroma component, we compute quantized chroma values (e.g., $s_i^{Cb}$ and $s_i^{Cr}$), so that chroma pixel values are within the bit-depth boundaries of our BL codec (e.g., [0 255]). These quantized values may be computed using the steps described earlier, for example, using equations (31-36).

Figure 8B:
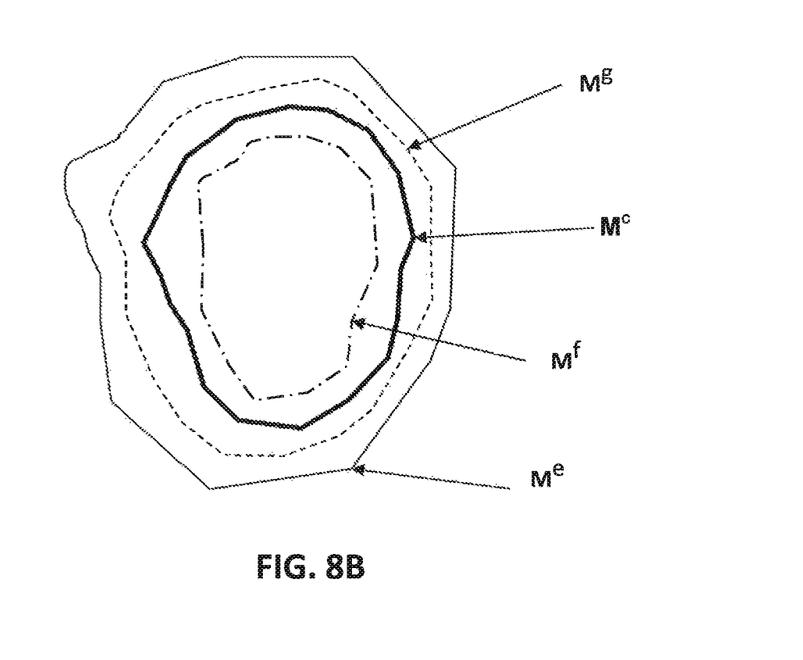
FIG. 8B depicts an example of determining a smooth transition area during chroma decomposition according to an embodiment of the present invention.

Since $M^c$ may contain holes or irregular shapes which may degrade the encoding efficiency, in step 750, a first closing morphological operation is contacted to determine a "close" area. Denote this area as $M^g$ (see FIG. 8). In other words, $M^g$ denotes a redefined chroma mask.

Next (755), given $M^g$, an erosion morphological operation is applied to determine an area smaller than $M^c$ which is set to a constant value, e.g., 128. This area is denoted as $M^f$ (see FIG. 8). The area between $M^g$ and $M^f$, namely $M^{g-f}=M^g\setminus M^f$, (or alternatively, all pixels inside $M^g$) may be smoothened to reduce the sharp areas around both boundaries. In one embodiment, smoothing (760) may be performed by applying a 2D filter, such as a 2D Gaussian filter, over the entire image, and by replacing the pixels in $M^{g-f}$ or $M^g$ the filtered results. In other embodiments, alternative filtering or smoothing techniques known in the art of image processing may be applied.

To further reduce the potential sharp edges in EL, starting again from $M^c$, the final EL area is determined using a second closing morphological operation (step 765), which yields the final area to be coded, denoted as $M^e$ (see FIG. 8). The second closing morphological operation has a wider perimeter of operation than the first closing morphological operation. Table 2 summarizes in pseudo-code the chroma quantization process using the smooth transition area process.

TABLE 2

Chroma Quantization using Chroma Smooth Transition Area

In Base Layer
(1) Quantize $v_i^C$ to 8-bit version $s_i^C$, where C can be Cb or Cr.
    (i) determine the $\{C_H^{Cb}, C_L^{Cb}\}$ and $\{C_H^{Cr}, C_L^{Cr}\}$ using equations (31-36)
    (ii) Use equations (31-32) to obtain the quantized (e.g., 8-bit) BL data.
(2) Determine $M^c$
(3) Create a structure element, se($p^g$), (as disk shape with parameter, $p^g$)
    Apply morphological operations closing on $M^c$ with se($p^g$) to obtain $M^g$
(4) Create a structure element, se($p^f$), (as disk shape with parameter, $p^f$)
    Apply morphological operations erode on $M^g$ with se($p^f$) to obtain $M^f$
    Assign a constant value, $C^f$, (e.g., 128) to all pixels in set $M^f$
    $s_i^C = C^f$ for i ∈ $M^f$
(5) Create a 2D Gaussian Filter (number of taps, $h_g$, and standard deviation, $\sigma_g$]
    Filter each chroma value $s_i^C$ by 2D filter and output the filtered value, $\bar{s}_i^C$
    (i) For pixel i between $M^g$ and $M^f$ (i.e. $M^{g-f} = M^g \setminus M^f$), replace BL value by $\bar{s}_i^C$
    $s_i^C = \bar{s}_i^C$ for i ∈ $M^{g-f}$
    Alternatively:
    (ii) For pixel i in $M^g$, replace BL value by $\bar{s}_i^C$
    $s_i^C = \bar{s}_i^C$ for i ∈ $M^g$
In Enhancement Layer
(1) create a structure element, se($p^e$), (as disk shape with parameter, $p^e$, where $p^e > p^g$)
    Apply morphological operations closing on $M^c$ with se($p^e$) to obtain $M^e$
(2) For chroma pixel i ∈ $M^e$, compute the residual pixel value and code it in the EL.

As an example, the following parameter values may be used when computing the functions in Table 2. For the morphological structure element for the first closing, $p^g=10$. For the morphological structure element for erosion, $p^f=30$. For the morphological structure element for the second closing, $p^e=30$. For the Gaussian filter parameters, $h_g=11$, and $\sigma_g=1$. For the constant value inside $M^f$, $c^f=128$. The constant value inside $M^f$ can be adapted so that it minimizes the maximal residual in EL.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to joint adaptation of BL and EL quantizers, such as those described herein. The computer and/or IC may compute any of a variety of parameters or values that relate to joint adaptation of BL and EL quantizers as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement joint adaptation of BL and EL quantizers methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to joint adaptation of BL and EL quantizers are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a plurality of input pixels to be encoded by an encoder, the encoder comprising a base layer quantizer (BLQ) and an enhancement layer quantizer (ELQ);
selecting a first clipping mode;
for the first clipping mode selecting a first plurality of candidate sets of parameters for the BLQ;
for each candidate set of BLQ parameters in the first plurality of candidate sets:
computing with the encoder a first BLQ distortion metric based on a first BLQ distortion function;
computing with the encoder a first ELQ distortion metric based on a first ELQ distortion function;
computing a first joint BLQ-ELQ distortion value based on the first BLQ distortion metric, the first ELQ distortion metric, and at least in part on the number of pixels to be quantized by the ELQ under the first clipping mode;
determining a first output BLQ parameter set among the first plurality of candidate sets, wherein the first output BLQ parameter set comprises the candidate set for which the computed first joint BLQ-ELQ distortion value is the smallest;
selecting a second clipping mode;
for the second clipping mode, selecting a second plurality of candidate sets of parameters for the BLQ;
for each candidate set of BLQ parameters in the second plurality of candidate sets:
computing with the encoder a second BLQ distortion metric based on a second BLQ distortion function;
computing with the encoder a second ELQ distortion metric based on a second ELQ distortion function;
computing a second joint BLQ-ELQ distortion value based on the second BLQ distortion metric, the second ELQ distortion metric, and at least in part on the number of pixels to be quantized by the ELQ under the second clipping mode;
determining a second output BLQ parameter set among the second plurality of candidate sets, wherein the second output BLQ parameter set comprises the candidate set for which the computed second joint BLQ-ELQ distortion value is the smallest;
computing a third joint output distortion value based on the first output BLQ parameter set and the first joint BLQ-ELQ distortion function;
computing a fourth joint output distortion value based on the second output BLQ parameter set and the second joint BLQ-ELQ distortion function; and
selecting the first output BLQ parameter set if the third joint output distortion value is smaller than the fourth joint distortion value, otherwise selecting the second output BLQ parameter set.

2. The method of claim 1, wherein the first clipping mode is a low-clipping mode and the second clipping mode is a high-clipping mode.

3. The method of claim 1, wherein the first ELQ distortion function and the second ELQ distortion function are different.

4. The method of claim 1, wherein the BLQ is a linear quantizer and the candidate set of BLQ parameters in the first plurality of candidate sets comprises a fixed high-clipping output parameter ($C_H$) and a variable low-clipping output parameter ($C_L$).

5. The method of claim 4, wherein the fixed high-clipping parameter is equal to 255.

6. The method of claim 4, wherein the variable low-clipping output parameter is smaller than zero.

7. The method of claim 1, wherein the BLQ is a linear quantizer and the candidate set of BLQ parameters in the second plurality of candidate sets comprises a variable high-clipping output parameter ($C_H$) and a fixed low-clipping output parameter ($C_L$).

8. The method of claim 7, wherein the fixed low-clipping parameter is equal to zero.

9. The method of claim 7, wherein the variable high-clipping output parameter is larger than 255.

10. A non-transitory computer-readable storage medium having stored thereon computer-executable instruction for executing a method with one or more processors in accordance with claim 1.

* * * * *